United States Patent
Choi et al.

(10) Patent No.: US 11,513,522 B2
(45) Date of Patent: Nov. 29, 2022

(54) ROBOT USING AN ELEVATOR AND METHOD FOR CONTROLLING THE SAME

(71) Applicant: LG ELECTRONICS INC., Seoul (KR)

(72) Inventors: Jeongeun Choi, Seoul (KR); Seulah Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 16/896,668

(22) Filed: Jun. 9, 2020

(65) Prior Publication Data
US 2021/0154843 A1     May 27, 2021

(30) Foreign Application Priority Data
Nov. 22, 2019   (KR) ......................... 10-2019-0151633

(51) Int. Cl.
G05D 1/00      (2006.01)
G05D 1/02      (2020.01)
(Continued)

(52) U.S. Cl.
CPC ........... *G05D 1/0088* (2013.01); *G05D 1/021* (2013.01); *G05D 1/0246* (2013.01); *G05D 1/0276* (2013.01); *B25J 5/007* (2013.01); *B25J 9/1666* (2013.01); *B25J 9/1679* (2013.01); *B25J 9/1697* (2013.01); *B66B 1/06* (2013.01); *B66B 1/3461* (2013.01); *B66B 1/3476* (2013.01); *G05D 1/0248* (2013.01)

(58) Field of Classification Search
CPC ........ B25J 9/1666; B25J 5/007; B25J 9/1679; B25J 9/1697; B25J 11/008; B25J 9/161; B25J 9/1664; B25J 9/1671; B25J 19/023; B66B 1/06; B66B 1/3461; B66B 1/3476; G05D 1/0088; G05D 1/0246; G05D 1/021; G05D 1/0276; G05D 1/0248; G06N 20/00
See application file for complete search history.

(56) References Cited

U.S. PATENT DOCUMENTS

2018/0111791 A1 * 4/2018 Fang ........................ B66B 1/28
2019/0133851 A1 * 5/2019 Bezault ................... B66B 3/004
(Continued)

FOREIGN PATENT DOCUMENTS

CN     110276302 A  *  9/2019
JP     2001171918 A *  6/2001
(Continued)

*Primary Examiner* — Abby Y Lin
*Assistant Examiner* — Karston G. Evans
(74) *Attorney, Agent, or Firm* — Ked & Associates LLP

(57) ABSTRACT

A robot may include a driving motor, a communication interface configured to communicate with an elevator control device, at least one sensor configured to sense an internal space of an elevator and a processor configured to determine whether boarding on the elevator is possible based on data received from the elevator control device or sensing data of the at least one sensor, set a boarding position based on information on the internal space of the elevator obtained through the communication interface or the at least one sensor when the boarding on the elevator is possible, and control the driving motor to move to the set boarding position.

18 Claims, 12 Drawing Sheets

(51) Int. Cl.
    *B25J 9/16*     (2006.01)
    *B66B 1/34*     (2006.01)
    *B66B 1/06*     (2006.01)
    *B25J 5/00*     (2006.01)

(56) References Cited

U.S. PATENT DOCUMENTS

| | | | |
|---|---|---|---|
| 2019/0248002 A1* | 8/2019 | Deyle | B25J 13/089 |
| 2019/0345000 A1* | 11/2019 | Park | B66B 1/461 |
| 2020/0055694 A1* | 2/2020 | Sokolov | B66B 1/468 |
| 2020/0180903 A1* | 6/2020 | Aberg | B66B 5/0012 |
| 2021/0078823 A1* | 3/2021 | Gou | B66B 1/3476 |
| 2021/0122606 A1* | 4/2021 | Kim | B66B 1/2408 |
| 2021/0122607 A1* | 4/2021 | Zhang | B66B 1/3461 |

FOREIGN PATENT DOCUMENTS

| | | | | |
|---|---|---|---|---|
| JP | 2012196731 A | * | 10/2012 | |
| JP | 2017220123 A | * | 12/2017 | |
| KR | 20180047571 A | * | 5/2018 | |
| WO | WO-2019106724 A1 | * | 6/2019 | B66B 17/20 |

\* cited by examiner

ROBOT USING AN ELEVATOR AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0151633, filed in Korea on Nov. 22, 2019, the contents of which are all hereby incorporated by reference herein in their entirety.

BACKGROUND

1. FIELD

The present disclosure relates to a robot and a method for controlling the same.

2. BACKGROUND

A robot is a machine that automatically handles or operates a given task by its own ability. The robot's application field is generally classified into various fields such as industrial, medical, space, and undersea. Recently, with the development of autonomous driving technology, automatic control technology using a sensor, communication technology, and the like, research for applying the robot to various fields has been continuously conducted.

A robot to which autonomous driving technology is applied may perform various operations or provide various services while driving indoors or outdoors. On the other hand, a robot which provides a service while traveling through various zones inside a building may use an elevator to move to another floor in the building. In this case, a driving control method for smooth elevator use may be required since situation related to boarding and deboarding on and from the elevator of the robot are different from the general driving situations.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
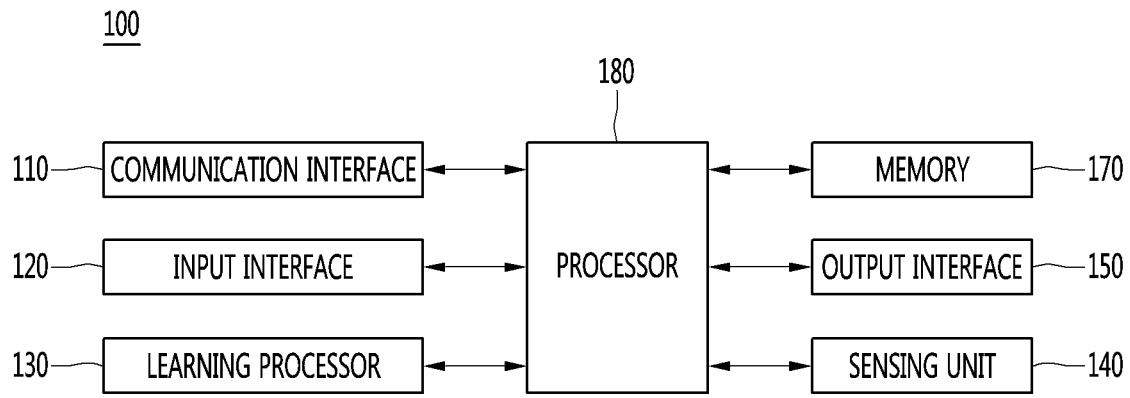
FIG. 1 illustrates an AI device including a robot according to an embodiment of the present disclosure.

Embodiments of the present disclosure will be described with reference to the accompanying drawings. The accompanying drawings are intended to facilitate understanding of the embodiments disclosed herein, and the technical spirit disclosed herein are not limited by the accompanying drawings. Therefore, the present disclosure should be construed as including all the changes, equivalents, and substitutions included in the spirit and scope of the present disclosure.

A robot may refer to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method. The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function FIG. 1 illustrates an AI device including a robot according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

The AI device 100 may include a communication interface 110, an input interface 120, a learning processor 130, a sensing unit 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data. At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation. At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense. At this time, the output interface 150 may include a display for outputting time information, a speaker for outputting auditory information, and a haptic interface for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information. The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
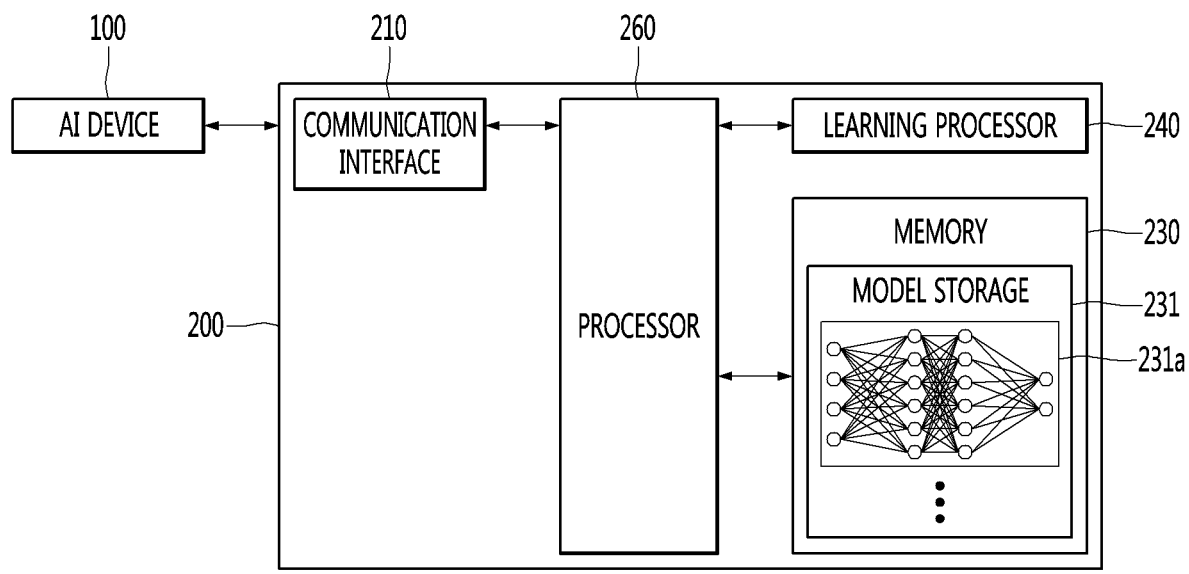
FIG. 2 illustrates an AI server connected to a robot according to an embodiment of the present disclosure.

FIG. 2 illustrates an AI server connected to a robot according to an embodiment of the present disclosure. The AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like. The communication interface 210 can transmit and receive data to and from an external device such as the AI device 100. The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
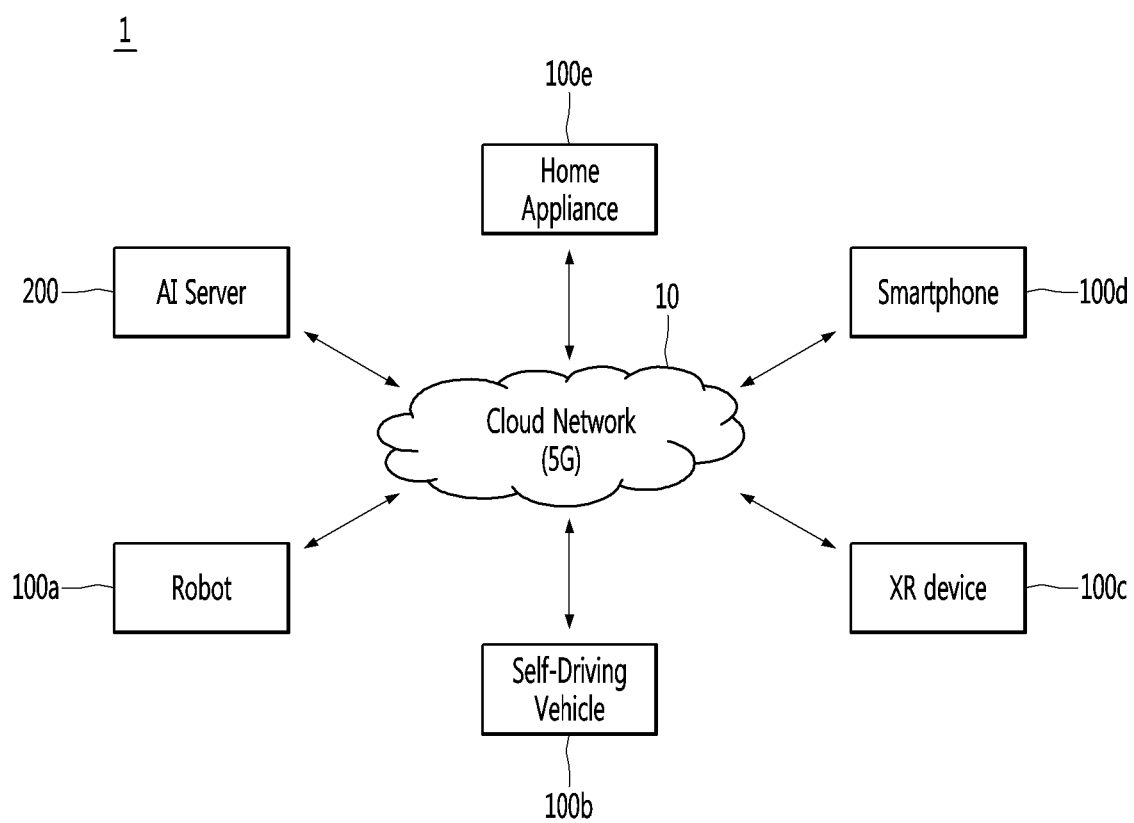
FIG. 3 illustrates an AI system including a robot according to an embodiment of the present disclosure.

FIG. 3 illustrates an AI system including a robot according to an embodiment of the present disclosure. In the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data. The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e. Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware. The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation. The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
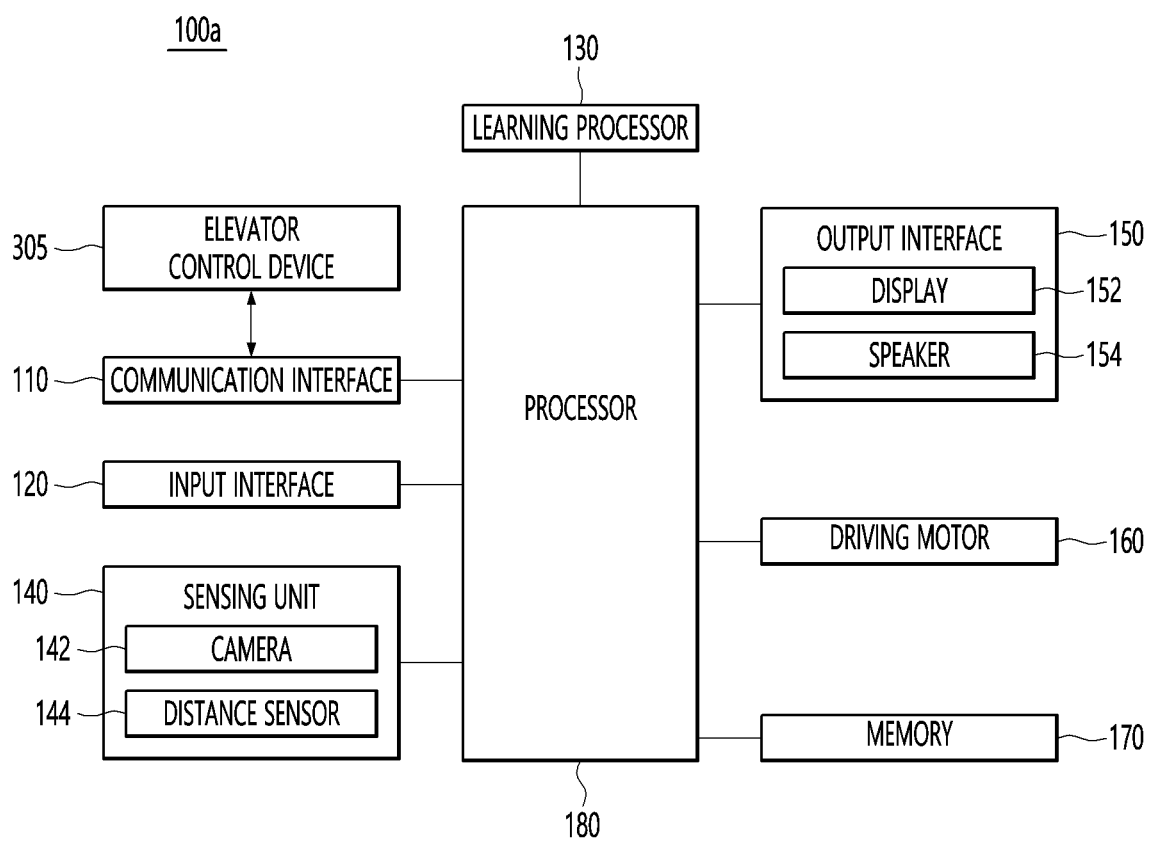
FIG. 4 is a block diagram of a control configuration of a robot according to an embodiment of the present disclosure.

FIG. 4 is a block diagram of a control configuration of a robot according to an embodiment of the present disclosure. A robot 100a may include a communication interface 110, an input interface 120, a learning processor 130, a sensing unit 140, an output interface 150, a memory 170, and a processor 180. The components illustrated in FIG. 4 are examples for convenience of description, and the robot 100a may include more or less components than those shown in FIG. 4. Meanwhile, the contents related to the AI device 100 of FIG. 1 are similarly applied to the robot 100a of the present disclosure, and the descriptions overlapping with those described above with reference to FIG. 1 will be omitted.

The communication interface 110 may include communication modules for connecting the robot 100a to a server, a mobile terminal, another robot or the like through a network. Each of the communication modules may support any one of the communication technologies described above with reference to FIG. 1.

For example, the robot 100a may be connected to a network through an access point such as a router. Accordingly, the robot 100a may provide a variety of information obtained through the input interface 120 or the sensing unit 140 to the server or the mobile terminal through the network. In addition, the robot 100a may receive information, data, commands, or the like from the server or the mobile terminal.

The input interface 120 may include at least one input means for obtaining various types of data. For example, the at least one input means may include a physical input means such as a button or a dial, a touch input interface such as a touch pad or a touch panel, a microphone that receives a user's speech or a sound around the robot 100a, and the like. A user may input various requests or commands to the robot 100a through the input interface 120.

The sensing unit 140 may include at least one sensor capable of sensing a variety of information around the robot 100a. For example, the sensing unit 140 may include at least one camera 142 for obtaining a surrounding image of the robot 100a. The at least one camera 142 may include a variety of types of cameras (e.g., a 2D camera, a 3D camera, and an infrared camera) which are known.

In addition, the sensing unit 140 may further include a distance sensor 144 for detecting a distance to a person or an object around the robot 100a. For example, the distance sensor 144 may be implemented with various types of sensors capable of detecting a distance such as an ultrasonic sensor and a lidar. According to an embodiment, the sensing unit 140 may further include sensors such as a proximity sensor, an illumination sensor, a gyro sensor, and the like.

The output interface 150 may output an operation or state of the robot 100a and a variety of information or content related to various services, programs, applications, or the like which are executed in the robot 100a. For example, the output interface 150 may include a display 152, a speaker 154, and the like.

The display 152 may output the aforementioned variety of information, messages, or content in a graphic form. The speaker 154 may output the variety of information, messages, or content in the form of speech or sound.

The at least one driving motor 160 is for movement (driving) of the robot 100a, and is connected to at least one wheel provided in the lower portion of the robot 100a, for example, to provide a driving force for driving of the robot 100a to the at least one wheel. The processor 180 may adjust a driving direction and/or a driving speed of the robot 100a by controlling the at least one driving motor 160.

The memory 170 may store various data such as control data for controlling operations of the components included in the robot 100a or data for performing an operation based on an input obtained through the input interface 220 or information obtained through the sensing unit 140. In addition, the memory 170 may store program data such as a software module or an application executed by at least one processor or controller included in the processor 180. The memory 170 may include various storage devices such as a ROM, a RAM, an EPROM, a flash drive, a hard drive, and the like, in hardware.

The processor 180 may include at least one processor or controller for controlling the operation of the robot 100a. Specifically, the processor 180 may be implemented with at least one CPU, an application processor (AP), a microcomputer (or a microcontroller), an integrated circuit, an application specific integrated circuit (ASIC), or the like.

Meanwhile, the robot 100a according to an embodiment of the present disclosure may perform a predetermined task while moving several floors in a building. For the movement through the various floors, a mobile robot may be implemented to board and deboard an elevator provided in the building.

Since not only the robot but also passengers board and deboard the elevator. The robot 100a may need to board the elevator in accordance with the optimal boarding manner based on the internal state of the elevator to minimize the inconvenience of other passengers.

Hereinafter, various embodiments related to an operation in which the robot 100a boards an elevator will be described with reference to FIGS. 5 through 14B.

Figure 5:
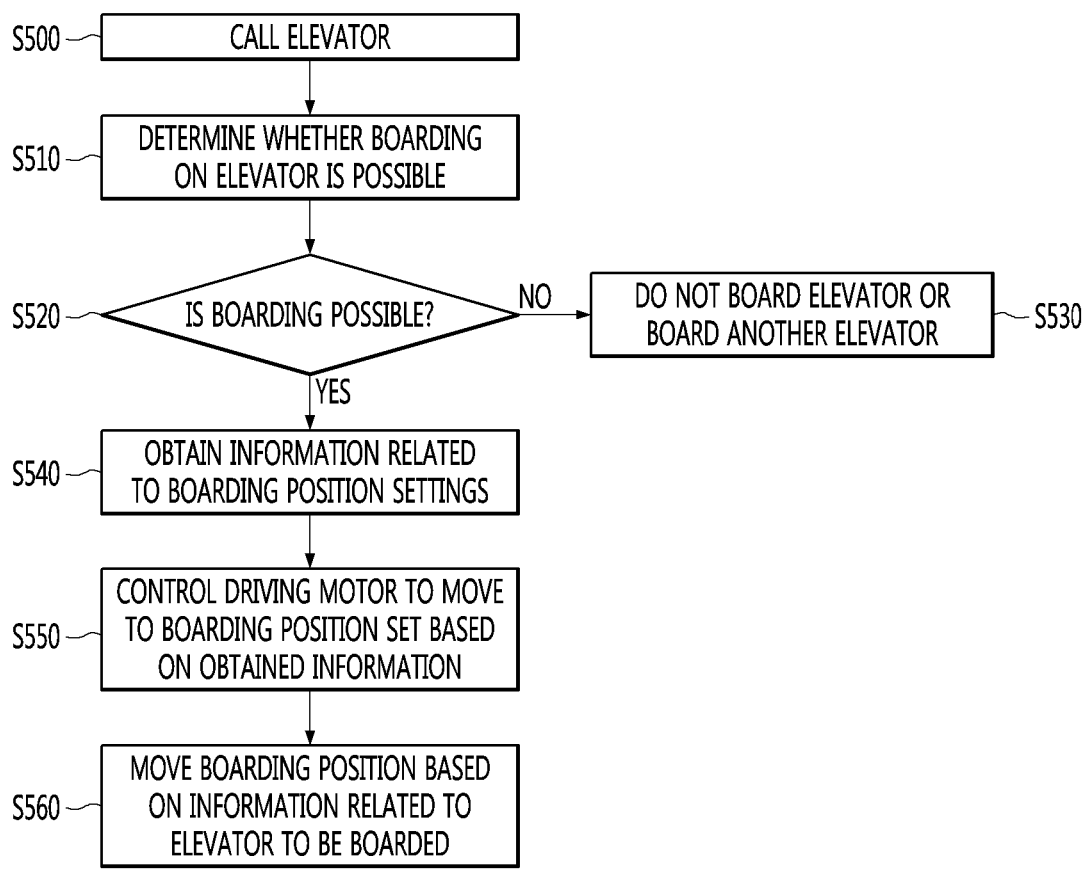
FIG. 5 is a flowchart for describing a control operation when a robot boards an elevator according to an embodiment of the present disclosure.

FIG. 5 is a flowchart for describing a control operation when a robot boards an elevator according to an embodiment of the present disclosure. The robot 100a may call an elevator for boarding on the elevator (S500).

The robot 100a may call the elevator to move from a current floor to another floor in a building. For example, when the robot 100a and an elevator control device 305 (for example, a computing device such as a server) are able to communicate with each other, the processor 180 may transmit an elevator call request to the elevator control device 305 through the communication interface 110, as shown in FIG. 4. Alternatively, when the robot 100a is provided with means for physically operating an elevator button (for example, a robot arm), the processor 180 may call the elevator by pressing the elevator button by controlling the means.

According to an embodiment, when the elevator has been called by another passenger, the processor 180 may wait without performing an operation for calling the elevator.

The robot 100a may determine whether boarding on the elevator is possible (S510). When the processor 180 detects that a door of the elevator is opened, the processor 180 may determine whether boarding on the elevator is possible based on an image of an internal space of the elevator obtained through the camera 142 and/or sensing data of the internal space of the elevator obtained through the distance sensor 144.

The processor 180 may determine whether there is an empty space (available boarding space) with a large size enough to accommodate the robot 100a in the internal space of the elevator based on information on the internal space of the elevator (an image and/or sensing data for the internal space). According to an embodiment, the processor 180 may receive an image of the internal space of the elevator from the elevator control device, and detect the presence or absence of the available boarding space based on the received image.

According to an embodiment, the processor 180 may receive information on whether boarding on the elevator is possible from the elevator control device at an arbitrary time point between a time point at which the elevator is called and a time point at which the door of the elevator is opened through the communication interface 110. For example, the information may be provided based on the presence or absence of an available boarding space, or whether boarding is possible based on a weight in an elevator.

When boarding on the elevator is impossible (NO in S520) as a result of the determination, the robot 100a may wait without boarding the elevator or may board another elevator (S530). On the other hand, when boarding on the elevator is possible (YES in S520) as a result of the determination, the robot 100a may obtain information (information on the internal space) for setting a boarding position in the elevator (S540).

The robot 100a may board the elevator by controlling the driving motor 160 to move to a boarding position set based on the obtained information (S550). The information (information on the internal space) may include an image obtained through the camera 142 or received from the elevator control device, and/or sensing data obtained through the distance sensor 144.

For example, the processor 180 may set a predetermined position in the available boarding space detected through the camera 142 and/or the distance sensor 144 as a boarding position in step S510, and control the driving motor 160 to move to the set boarding position. Alternatively, the processor 180 may control the driving motor 160 to move to a preset default position (default boarding position) for the corresponding elevator. Alternatively, the processor 180 may set a boarding position based on a predetermined boarding position setting condition. Some examples related to this will be described below with reference to FIGS. 6A to 6B.

Figure 6A:
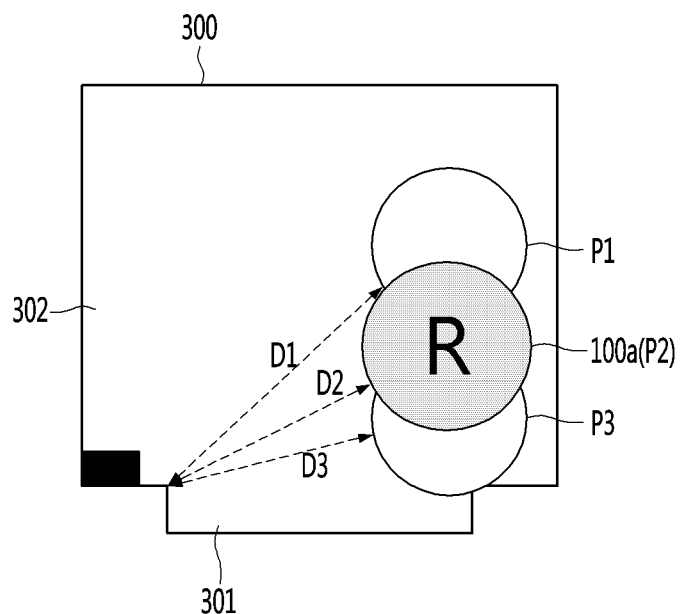
FIGS. 6A to 6B are exemplary views related to setting of an elevator boarding position of a robot.
Figure 6B:
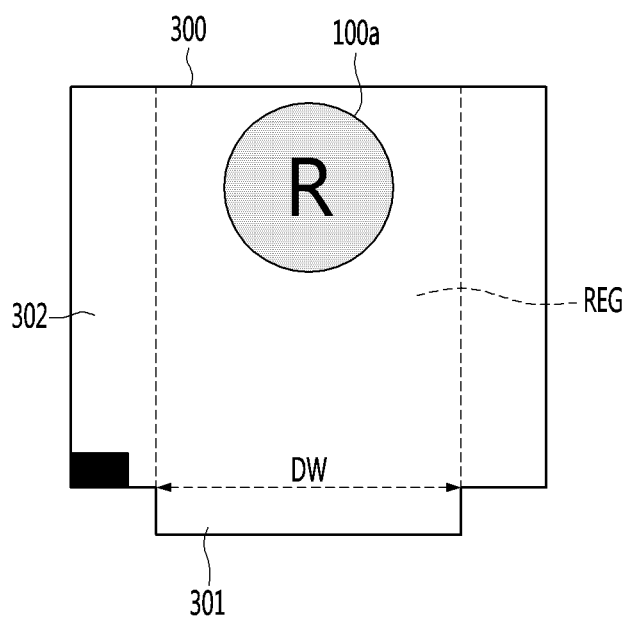

FIGS. 6A to 6B are exemplary views related to setting of an elevator boarding position of a robot. The processor 180 may set a position close to a doorway 301 in an internal space 302 of an elevator 300 as a boarding position for fast boarding and deboarding on and from the elevator 300.

Meanwhile, the processor 180 may set a boarding position such that one side of the doorway 301 and the robot 100a are spaced apart from each other by a predetermined reference distance or more for the boarding and deboarding of another passenger or an object (wheelchair or the like).

For example, a first position P1 may be located such that a distance D1 between one side of the doorway 301 and the robot 100a is greater than or equal to the reference distance, but may be relatively far from the doorway 301. Meanwhile, a third position P3 may be located such that a distance D3 to one side of the doorway 301 is less than the reference distance. A second position P2 may be closest to the doorway 301 while a distance D2 to the one side of the doorway 301 is greater than or equal to the reference distance.

That is, the processor 180 may set the second position P2 which is closest to the doorway 301 and at which the distance to one side of the doorway 301 is greater than or equal to the reference distance, as the boarding position of the robot 100a.

Referring to FIG. 6B, first, the internal space 302 may be defined as being located behind the doorway 301. The processor 180 may set a predetermined position in a region REG corresponding to the immediate area behind of the doorway 301 as the boarding position for easy boarding and deboarding of the robot 100a. That is, the width of the region REG may be equal to or smaller than the width DW of the doorway 301. In this case, since the robot 100a may board and deboard the elevator only by straight movement, a driving algorithm may be simplified.

In addition, the processor 180 may minimize discomfort during boarding and deboarding of another passengers or an object by setting a position corresponding to the rearmost area among available boarding positions in the region REG, as the boarding position.

In addition to the above-described examples, the processor 180 may set the boarding position according to various methods and control the driving motor 160 to move to the set boarding position. Embodiments related to this will be described in detail later with reference to FIGS. 7 through 14B.

According to an embodiment, the robot 100a may move (change) the boarding position based on information related to the elevator after boarding on the elevator (S560). After the boarding on the elevator, the processor 180 moves the boarding position based on a change in the number or position of passengers in the elevator, information on a change in the weight of the elevator, and a difference between the current floor number of the elevator and the deboarding floor number, enabling use of the elevator at more efficient positions.

Hereinafter, various embodiments related to setting of an elevator boarding position of the robot 100a will be described with reference to FIGS. 7 to 14B. Embodiments illustrated in FIGS. 7 to 14B may be implemented selectively and individually or may be applied in a combination thereof.

Figure 7:
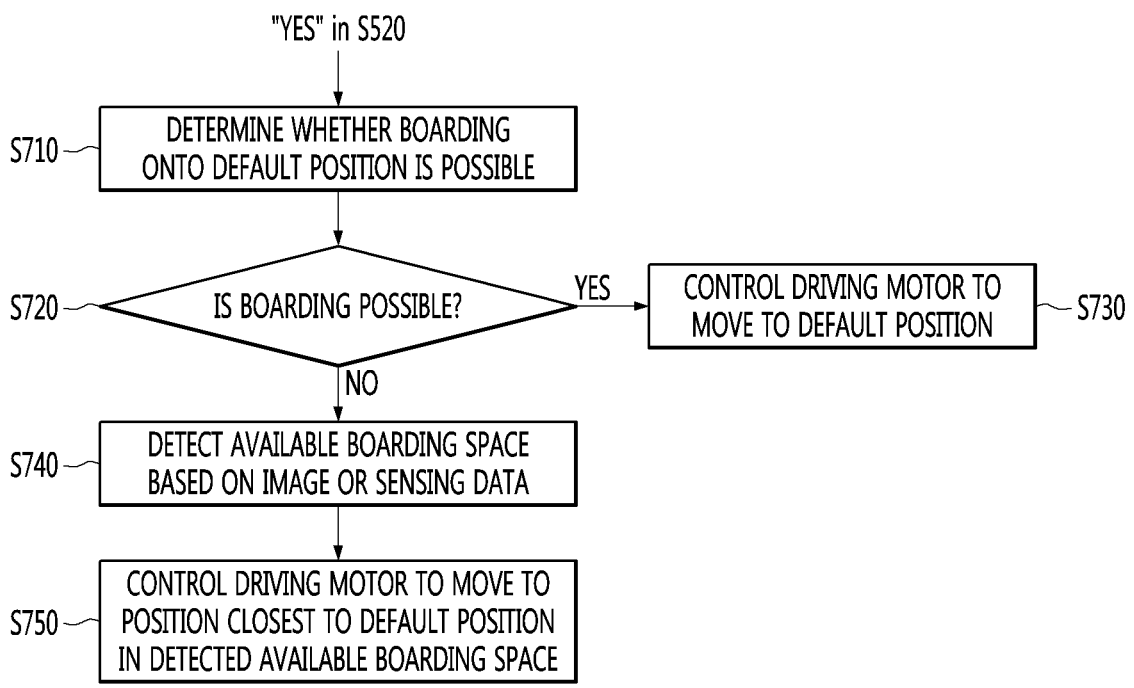
FIG. 7 is a flowchart for describing an example of a control operation performed based on whether boarding onto a default position is possible when a robot boards the elevator.

FIG. 7 is a flowchart for describing an example of a control operation performed based on whether boarding onto a default position is possible when a robot boards the elevator.

Referring to FIGS. 5 and 7, when the robot 100a is able to board an elevator (YES in S520), the robot 100a may determine whether boarding onto a default position is possible (S710).

The default position may correspond to a predetermined specific position among spaces in the elevator. Alternatively, the default position may correspond to a boarding position set according to the embodiment of FIGS. 6A to 6B.

The processor 180 may detect whether a region corresponding to the default position is empty by using the camera 142 and/or the distance sensor 144. Based on a result of the detection, the processor 180 may determine whether the boarding onto the default position is possible.

When the boarding onto the default position is possible (YES in S720), the processor 180 of the robot 100a may control the driving motor 160 to move to the default position (S730).

When the default position is empty (when a passenger or an object does not exist at the default position), the processor 180 may control the driving motor 160 to move the robot 100a to the default position to board the elevator. On the other hand, when the boarding onto the default position is impossible (NO in S720), the robot 100a may detect an available boarding space based on an image or sensing data for the interior of the elevator (S740).

When it is detected that the default position is not empty (e.g., when a passenger or an object exists at the default position), the processor 180 may detect the available boarding space based on an image obtained from the camera 142 or the elevator control device and/or sensing data detected by the distance sensor 144.

The robot 100a may control the driving motor 160 to move to a position closest to the default position in the detected available boarding space (S750). The default position may be an optimized position for boarding and deboarding of the robot 100a on and from the elevator or a position set to minimize disturbance on use of the elevator by other passengers. Therefore, the processor 180 may set a position closest to the default position in the detected available boarding space as the boarding position.

According to an embodiment, when there is a plurality of default positions which are set, the processor 180 may set a position closest to any one of the plurality of default positions as the boarding position.

Figure 8A:
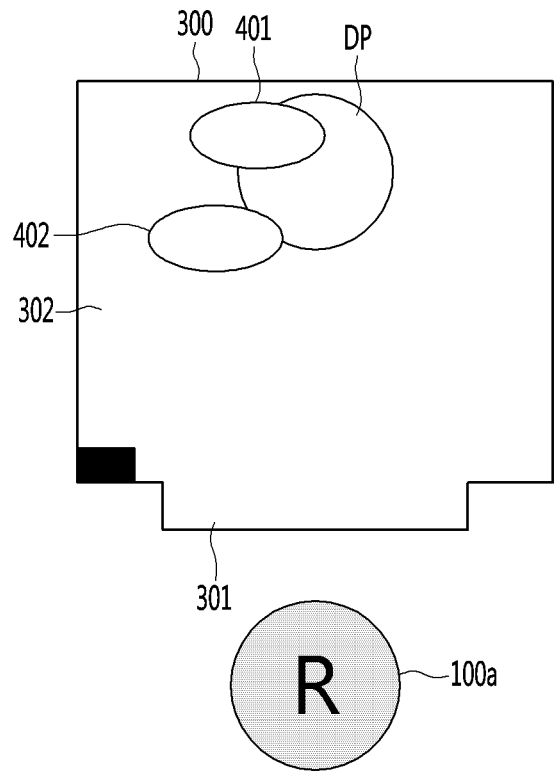
FIGS. 8A to 8C are exemplary diagrams related to the control operation of FIG. 7.
Figure 8B:
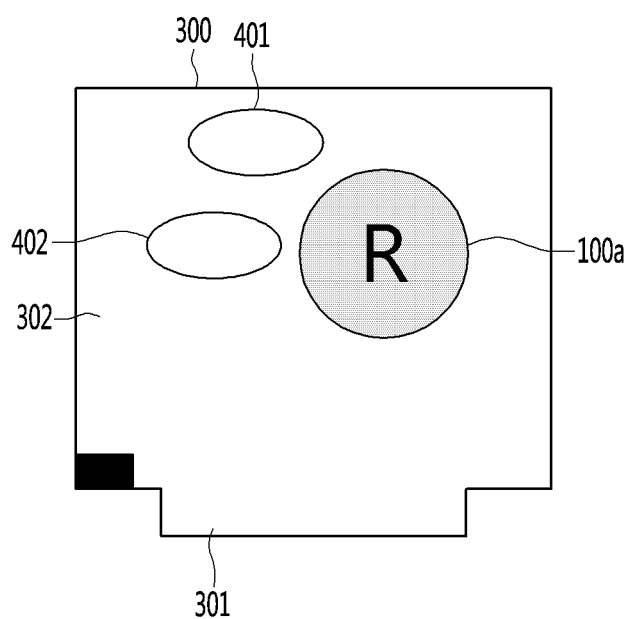
Figure 8C:
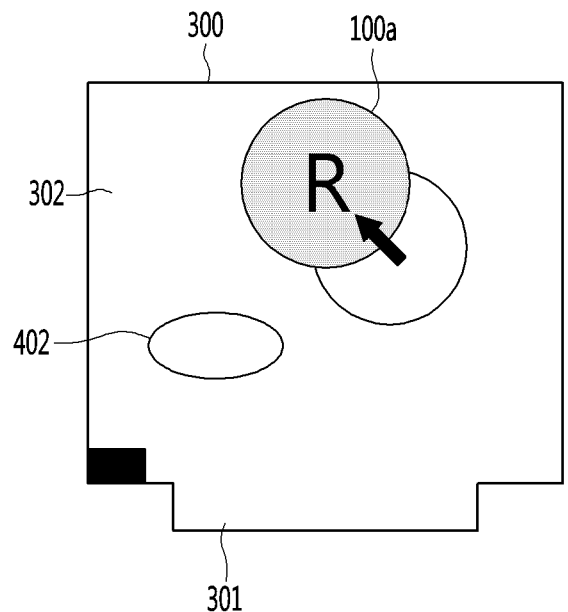

FIGS. 8A to 8C are exemplary diagrams related to the control operation of FIG. 7. Referring to FIGS. 8A and 8B, the processor 180 of the robot 100a may determine whether boarding onto a preset default position DP is possible when the doorway 301 is open as the door of the elevator 300 is opened.

For example, the processor 180 may obtain an image including the internal space 302 of the elevator 300 from the camera 142 or the elevator control device, or obtain sensing data for the internal space 302 through the distance sensor 144.

The processor 180 may detect that a first passenger 401 and a second passenger 402 exist in a portion of a region corresponding to the default position DP based on the obtained image and/or sensing data. In this case, the processor 180 may recognize an available boarding space based on the image and/or the sensing data, and set a position closest to the default position DP in the recognized available boarding space as the boarding position. The processor 180 may control the driving motor 160 to move to the set boarding position.

Although not shown, according to an embodiment, when the presence of another passenger is recognized at the default position DP, the processor 180 may output a movement request for the boarding position through the output interface 150. When the other passenger moves to a position that does not overlap the default position DP in response to the output movement request, the processor 180 may control the driving motor 160 to move to the default position DP.

On the other hand, after boarding on the elevator 300, the processor 180 may periodically or continuously detect a space state according to the deboarding or movement of the passenger existing in the internal space 302. The processor 180 may adjust the boarding position based on a result of the detection.

In this regard, referring to FIG. 8C, the processor 180 may detect that it is possible to move to the default position DP due to deboarding of the first passenger 401 located at the default position DP and movement of the second passenger 402 based on the above-described image and/or sensing data.

The processor 180 may adjust the boarding position of the robot 100a by controlling the driving motor 160 to move to the default position DP. That is, according to the embodiment illustrated in FIGS. 7 to 8C, when the boarding onto the preset default position DP is impossible in the case of boarding on the elevator 300, the robot 100a may intelligently set another appropriate boarding position and board the elevator. In addition, the robot 100a may set a position closest to the default position DP as the boarding position, thereby minimizing efficiency deterioration during boarding and deboarding and minimizing inconvenience of other passengers.

Figure 9:
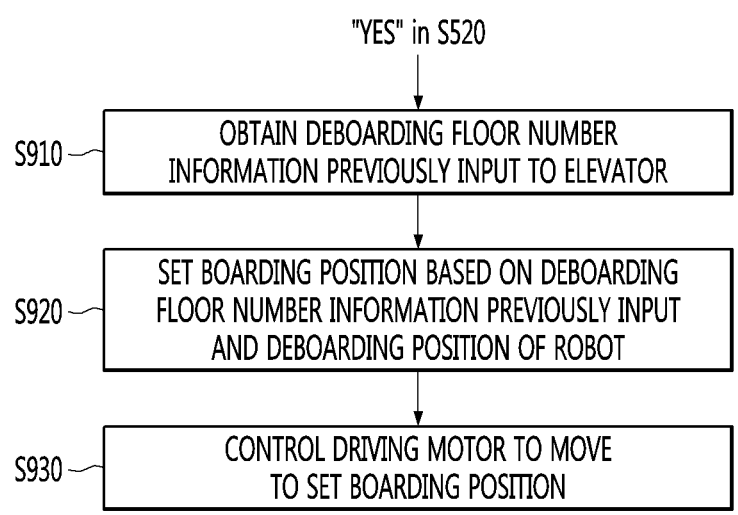
FIG. 9 is a flowchart for describing an operation of controlling boarding on an elevator based on a deboarding floor number in a robot.

FIG. 9 is a flowchart for describing an operation of controlling boarding on an elevator based on a deboarding floor number in a robot. Referring to FIGS. 5 and 9, when boarding on the elevator is possible (YES in S520), the robot 100a may obtain information on the deboarding floor number previously input to the elevator (S910).

The processor 180 may receive information on the deboarding floor number including at least one deboarding floor number previously input by a passenger of the elevator, from an elevator control device. Alternatively, the processor 180 may obtain, through the camera 142, an image including a deboarding floor number information output interface 303 (see FIG. 10A) installed in the elevator to display the deboarding floor number information after boarding on the elevator. The processor 180 may obtain the deboarding floor number information by processing the image obtained through the camera 142.

The robot 100a may set a boarding position based on the deboarding floor number information previously input and the deboarding floor number of the robot 100a (S920). The robot 100a may control the driving motor 160 to move to the set boarding position (S930).

The processor 180 may compare at least one deboarding floor number included in the obtained deboarding floor number information with the deboarding floor number of the robot 100a and set the boarding position based on a result of the comparison.

Specifically, the processor 180 may set a boarding position by estimating a relative deboarding order of the robot 100a with respect to the other passenger(s) of the elevator based on the result of the comparison. For example, when the robot 100a boards the elevator at the 'first floor', the deboarding floor number previously input is '3rd floor' and '5th floor', and the deboarding floor number of the robot 100a is '7th floor', the processor 180 may estimate that the deboarding order the robot 100a is later than those of other passengers in the elevator.

The processor 180 may set a boarding position based on a result of the estimation for the deboarding order. The processor 180 may set the boarding position to a position to be closer to the doorway of the elevator as the deboarding order is earlier, and set the boarding position to a position to be farther from the doorway of the elevator as the deboarding order is later.

Figure 10A:
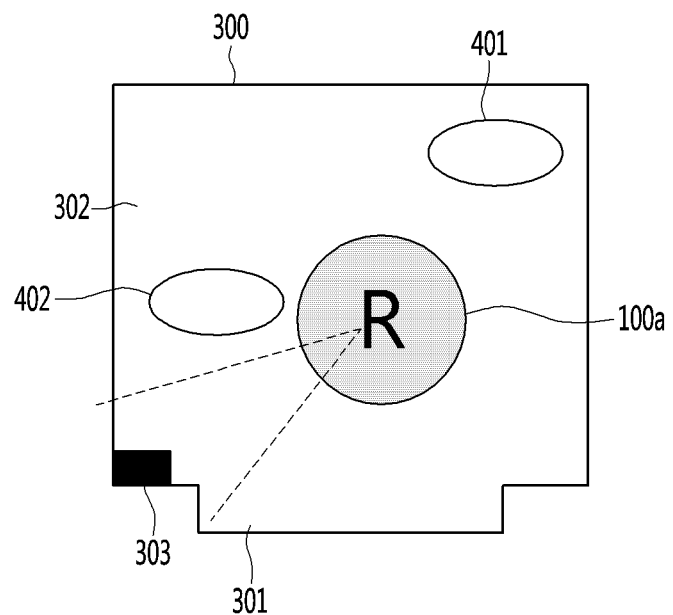
FIGS. 10A to 10B are exemplary diagrams related to the control operation of FIG. 9.
Figure 10B:
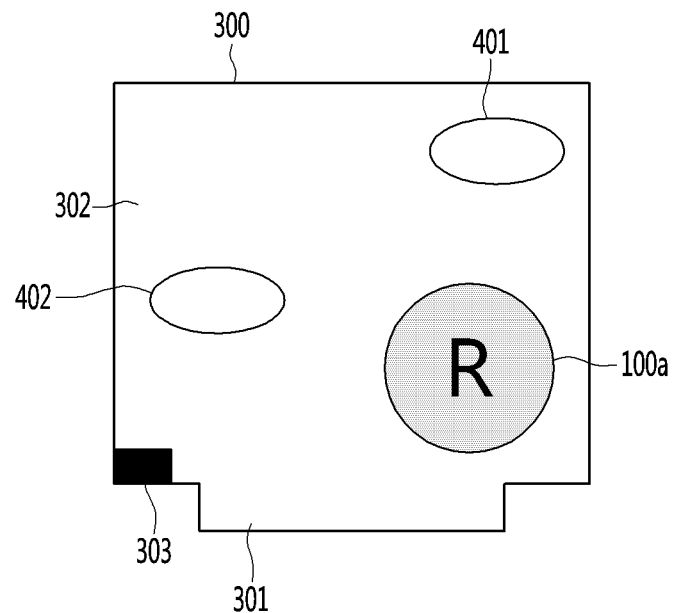

FIGS. 10A to 10B are exemplary diagrams related to the control operation of FIG. 9. Referring to FIG. 10A, the processor 180 may obtain an image including the deboarding floor number information output interface 303 by controlling the camera 142 at the time of boarding on the elevator 300. For example, the deboarding floor number information output interface 303 may be implemented in the form of a plurality of buttons each including a light source or a display.

The processor 180 may recognize at least one deboarding floor number input previously from the obtained image. For example, when the deboarding floor number information output interface 303 includes a plurality of buttons, the processor 180 may identify at least one button in which a light source is turned on, and recognize a floor number corresponding to each of the at least one button which is identified to recognize the at least one deboarding floor number.

The processor 180 may estimate a relative deboarding order of the robot 100a with respect to the other passengers 401 and 402 by comparing the recognized at least one deboarding floor number with the discharging floor number of the robot 100a.

Referring to FIG. 10B, when it is estimated that the deboarding order of the robot 100a is earlier than the deboarding order of the other passengers 401 and 402, the processor 180 may set a position close to the doorway 301 as the boarding position and control the driving motor 160 to move to the boarding position.

That is, according to the embodiments illustrated in FIGS. 9 to 10B, the robot 100a may estimate a relative deboarding order of the robot 100a with respect to other passengers and set a boarding position, thus improving driving convenience in the case of deboarding and minimizing contact and collision with other passengers during deboarding.

Although not shown, the processor 180 may set a boarding position based on a difference between the boarding floor number and the deboarding floor number of the robot 100a. For example, the processor 180 may set the boarding position to be closer to the doorway of the elevator as a difference between the deboarding floor number and the boarding floor number is smaller. Furthermore, the processor 180 may set the boarding position to be farther from the doorway as a difference between the deboarding floor number and the boarding floor number is larger.

Figure 11:
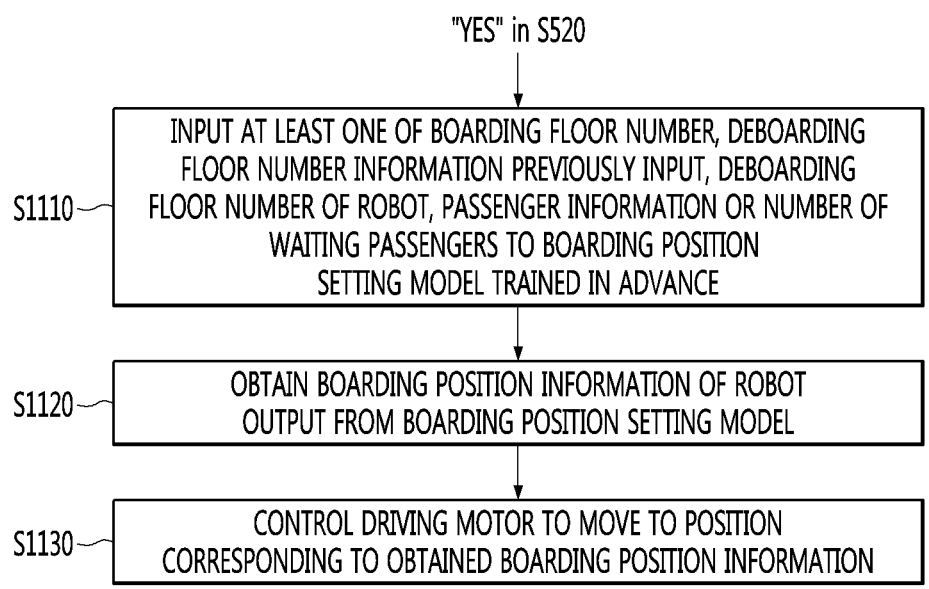
FIG. 11 is a flowchart for describing an operation in which a robot controls boarding on an elevator using a model trained based on artificial intelligence.
Figure 12:
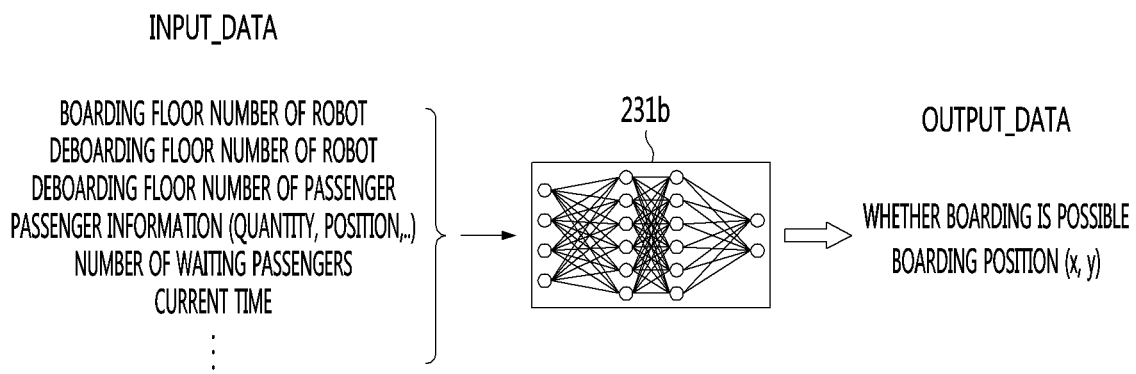
FIG. 12 is an exemplary diagram related to the control operation of FIG. 11.

FIG. 11 is a flowchart for describing an operation in which a robot controls boarding on an elevator using a model trained based on artificial intelligence. FIG. 12 is an exemplary diagram related to the control operation of FIG. 11.

Referring to FIGS. 5, 11, and 12, when boarding on an elevator is possible (YES in S520), the robot 100a may input at least one (INPUT_DATA) of deboarding floor number information previously input to the elevator, a boarding floor number and a deboarding floor number of the robot 100a, passenger information or the number of waiting passengers to a boarding position setting model 231b trained in advance (S1110).

The boarding position setting model 231b is a model trained by the learning processor 130 of the robot 100a or the learning processor 240 of the server 200a, and may include, for example, an artificial neural network based on machine learning (deep learning).

The boarding position setting model 231b may output data OUTPUT_DATA including a boarding position labeled with respect to at least one of the previously inputted boarding floor number information, the boarding floor number and the deboarding floor number of the robot 100a, the passenger information, or the number of waiting passengers.

The boarding position setting model 231*b* may be implemented in hardware, software, or a combination thereof. When some or all of the boarding position setting model 231*b* is implemented in software, one or more instructions constituting the boarding position setting model 231*b* may be stored in the memory 170.

As described above with reference to FIG. 9, the processor 180 may obtain the deboarding floor number information previously input based on the image obtained through the camera 142 or obtain the deboarding floor number information, which is previously input, from an elevator control device.

In addition, the processor 180 may obtain the passenger information based on at least one of an image obtained through the camera 142, sensing data obtained through the distance sensor 144, or data received from the elevator control device. For example, the passenger information may include the position, number, weight, and the like of a passenger or an object existing in the elevator.

In addition, the processor 180 may obtain information on the number of waiting passengers based on data received from the elevator control device or a building management device. For example, the elevator control device or the building management device may transmit an image obtained through a CCTV provided at each elevator waiting position of each floor in the building to the robot 100*a*, and the processor 180 may obtain information on the number of waiting passengers based on the received image. Alternatively, the elevator control device or the building management device may obtain the information on the number of waiting passengers based on the obtained image, and transmit the obtained information to the robot 100*a*.

According to an embodiment, as illustrated in FIG. 12, the data INPUT_DATA input to the boarding position setting model 231*b* may further include various data such as a current time.

The robot 100*a* may obtain boarding position information of the robot 100*a* from the data OUTPUT_DATA output from the boarding position setting model 231*b* (S1120). The robot 100*a* may control the driving motor 160 to move to a position corresponding to the obtained boarding position information (S1130).

The boarding position setting model 231*b* may infer a result value for the input data INPUT_DATA and may output the data OUTPUT_DATA including the inferred result value. For example, the data OUTPUT_DATA may output a boarding position of the robot 100*a* in the form of coordinates. According to an embodiment, the data OUTPUT_DATA may further include information on whether boarding of the robot 100*a* is possible.

The processor 180 may control the driving motor 160 to move to the boarding position obtained from the data OUTPUT_DATA.

According to an embodiment, the processor 180 or the learning processor 130 may perform a learning operation of the boarding position setting model 231*b* by using a boarding result (completion of boarding or impossibility of boarding) after movement to the obtained boarding position. The boarding position setting model 231*b* may be updated by the learning operation.

That is, according to the embodiments shown in FIGS. 11 and 12, the robot 100*a* may set an optimal boarding position according to various information related to the use of an elevator by using a model trained based on artificial intelligence.

Figure 13:
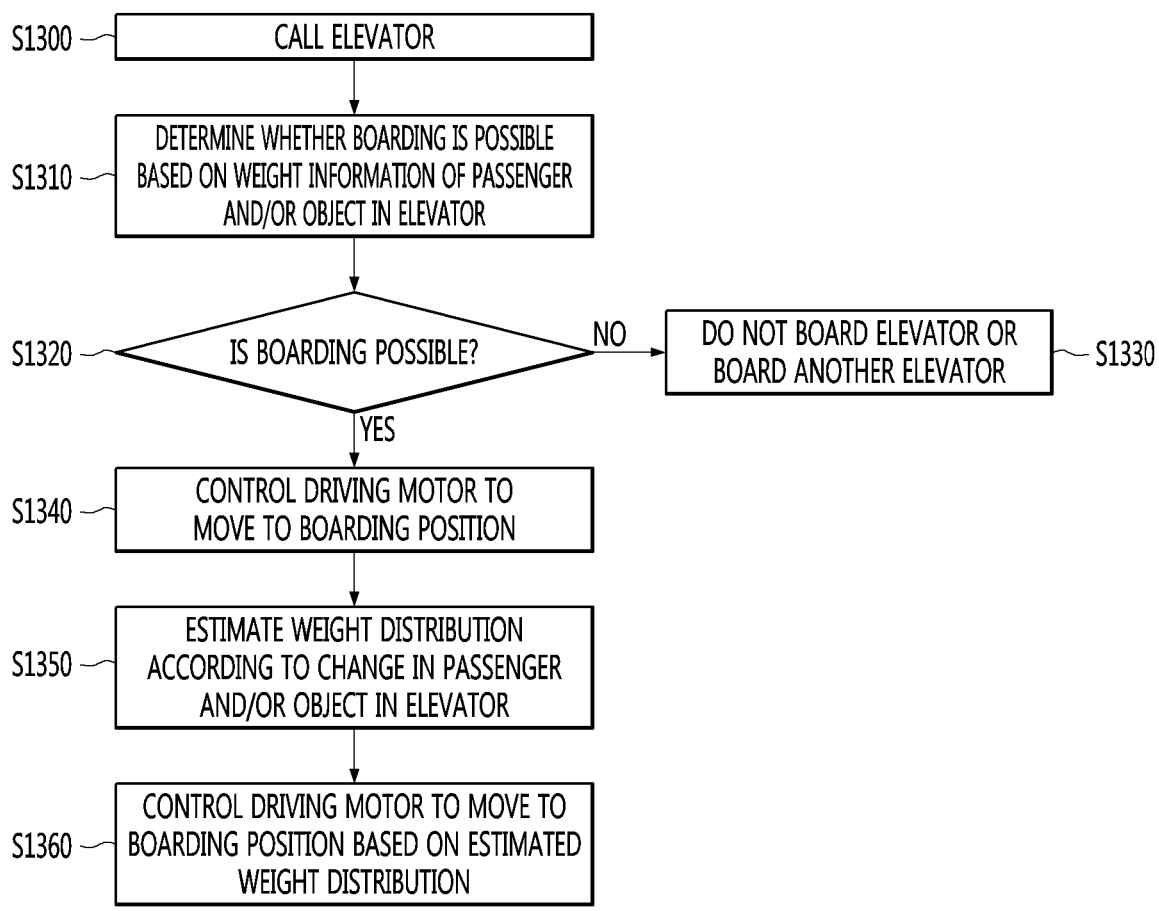
FIG. 13 is a flowchart for describing an operation of setting and changing a boarding position according to information on a load weight in an elevator.

FIG. 13 is a flowchart for describing an operation of setting and changing a boarding position according to information on a load weight in an elevator. Referring to FIG. 13, the robot 100*a* may call an elevator (S1300) and determine whether the robot is able to board the elevator based on weight information of a passenger and/or an object existing in the elevator (S1310).

The elevator may include a sensor that detects the total weight of the passenger and object in the elevator (hereinafter defined as a load weight). The elevator control device may limit boarding of an additional passenger or object when the load weight detected by the sensor reaches a preset threshold weight (or rated weight).

The processor 180 may receive information on the load weight from the elevator control device, and determine whether boarding is possible depending on whether the sum of the load weight and the weight of the robot 100*a* exceeds the threshold weight.

According to an embodiment, when the door of the elevator is opened, the processor 180 may obtain an image of the internal space through the camera 142 and detect a passenger and an object existing in the internal space from the obtained image. The processor 180 may estimate the load weight based on the detected passenger and object, and determine whether or not boarding is possible depending on whether the sum of the estimated load weight and the weight of the robot 100*a* exceeds a threshold weight.

As a result of the determination, when boarding on the elevator is impossible (NO in S1320), the robot 100*a* may wait without boarding the elevator or may board another elevator (S1330). When the sum of the load weight and the weight of the robot 100*a* exceeds the threshold weight, the processor 180 may wait without boarding the elevator or board another elevator.

As a result of the determination, when boarding on the elevator is possible (YES in S1320), the robot 100*a* may control the driving motor 160 to move to the boarding position (S1340). When the sum of the load weight and the weight of the robot 100*a* is less than or equal to the threshold weight, the processor 180 may determine that boarding on the elevator is possible.

In this case, the processor 180 may control the driving motor 160 to move to the boarding position set according to the embodiments shown in FIGS. 5 to 12.

According to an embodiment, after boarding on the elevator, the robot 100*a* may estimate weight distribution in the elevator according to a change in the passenger and/or the object which are on board (S1350). The robot 100*a* may control the driving motor 160 to move the boarding position based on the estimated weight distribution (S1360).

The processor 180 may detect a change in the number or position of passengers and/or objects existing in the elevator by using an image obtained through the camera 142 and/or sensing data obtained through the distance sensor 144, and estimate weight distribution in the elevator based on a result of the detection.

The processor 180 may move the position of the robot 100*a* to a position capable of reducing a weight deviation when it is estimated that the weight deviation between the predetermined regions in the elevator is greater than or equal to a reference deviation. Alternatively, the processor 180 may set the position of the robot 100*a* such that the center of gravity of the elevator is located at the center of the internal space based on the estimated weight distribution, and control the driving motor 160 to move to the set position.

Figure 14A:
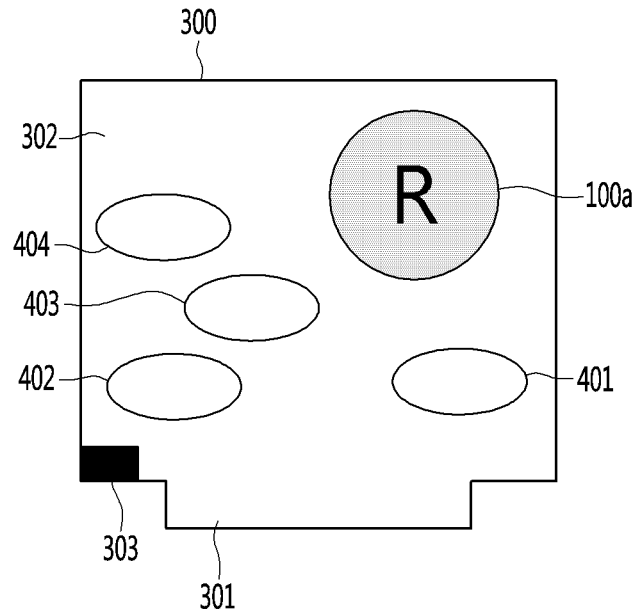
FIGS. 14A to 14B are exemplary diagrams related to the operation of FIG. 13.
Figure 14B:
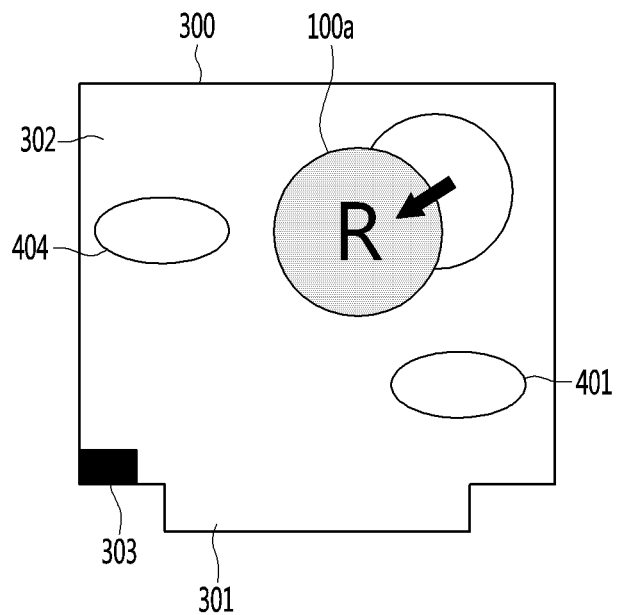

FIGS. 14A to 14B are exemplary diagrams related to the operation of FIG. 13. Referring to FIG. 14A, when it is determined that boarding of the robot 100*a* is possible based on the load weight of the elevator 300, the processor 180 may control the driving motor 160 to move to a set boarding position.

According to an embodiment, the processor 180 may set a boarding position based on the passenger distribution of the internal space 302. As shown in FIG. 14A, when a first passenger 401 to a fourth passenger 404 exist in the internal space 302, the center of gravity may be located between a central portion of the internal space 302 and the deboarding floor number information output interface 303. The processor 180 may set the boarding position to the position shown in FIG. 14A in order to move the center of gravity to the center portion of the internal space 302.

Meanwhile, referring to FIG. 14B, when the second passenger 402 and the third passenger 403 deboard the elevator during the movement of the elevator after boarding of the robot 100a, the position of the center of gravity may be changed due to the deboarding of the passengers. The processor 180 may detect a change in the number and position of passengers through the sensing unit 140 and estimate a change in the position of the center of gravity based on a result of the detection.

The processor 180 may change the position of the robot 100a to move the changed center of gravity position back to the center portion of the internal space 302. That is, according to the embodiment illustrated in FIGS. 13 to 14B, the robot 100a may determine whether to board the elevator according to the load weight of the elevator, thus preventing unstable movement or failure of the elevator due to overload. In addition, the robot 100a may adjust the boarding position based on the weight distribution or the center of gravity in the elevator, thereby preventing an unstable movement of the elevator due to the weight deviation and minimizing the occurrence of a failure of the elevator.

According to an embodiment of the present disclosure, the robot may set an optimal boarding position that achieves ease of driving or minimize the disturbance on other passengers based on various situations detected by a sensor or the like at the time of boarding on the elevator.

In addition, the robot may intelligently set another appropriate boarding position when boarding onto the preset default position is impossible in the case of boarding on the elevator. In particular, the robot may set a position closest to the default position as the boarding position, minimizing reduction in efficiency during boarding and deboarding, and minimizing the inconvenience of other passengers.

In addition, the robot may estimate a relative deboarding order of the robot with respect to other passengers and set a boarding position, thus improving driving convenience in the case of deboarding and minimizing contact and collision with other passengers during deboarding.

In addition, the robot may set an optimal boarding position according to various information related to the use of an elevator by using a model trained based on artificial intelligence.

In addition, the robot may determine whether to board the elevator according to the load weight of the elevator, thus preventing unstable movement or failure of the elevator due to overload.

In addition, the robot may adjust the boarding position based on the weight distribution or the center of gravity in the elevator, thereby preventing unstable movement of the elevator due to the weight deviation and minimizing the occurrence of a failure of the elevator.

An object of the present disclosure is to provide a robot for setting an optimal boarding position on the basis of a variety of data associated with an elevator at the time of boarding on the elevator.

A robot according to an embodiment of the present disclosure may determine whether boarding on an elevator is possible based on data received from an elevator control device or sensing data of a sensing unit of the robot, set a boarding position based on information on the internal space of the elevator obtained through the communication interface or the at least one sensor when the boarding on the elevator is possible, and control a driving motor to move to the set boarding position.

The robot may detect whether there is an available boarding space based on an image of an internal space obtained through a camera of the sensing unit or received from an elevator control device or sensing data of the internal space obtained through a distance sensor of the sensing unit.

According to an embodiment, the robot may set a position at which a distance from one side of a doorway of the elevator is greater than or equal to a reference distance in the internal space of the elevator and which is closest to the doorway, as the boarding position.

According to an embodiment, the robot may determine whether boarding onto a preset default boarding position in the internal space is possible and board the elevator at a position closest to the default boarding position.

According to an embodiment, the robot may estimate a deboarding order based on at least one deboarding floor number which is previously input to the elevator and a deboarding floor number of the robot, and set the boarding position based on the estimated deboarding order.

According to an embodiment, the robot set the boarding position based on a difference between a boarding floor number and a deboarding floor number.

According to an embodiment, the robot may set the boarding position based on various types of data using a boarding position setting model trained by a machine learning algorithm.

According to an embodiment, the robot may determine whether boarding is possible based on the load weight of the elevator, the weight of the robot, and the rated weight of the elevator.

According to an embodiment, the robot may set or adjust the boarding position based on weight distribution of the internal space of the elevator.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a driving motor to provide a driving force to move the robot;
   a communication interface configured to communicate with an elevator control device, the elevator control device including a computing device;
   at least one detecting device configured to obtain information of an internal area of an elevator; and
   a processor configured to:
      determine whether the robot to board the elevator or to not to board the elevator based on data received from the elevator control device or data received from the at least one detecting device,
      when the robot is determined to board the elevator, set a boarding position within the internal area based on information of the internal area obtained from the communication interface or from the at least one detecting device, and
      control the driving motor to move the robot to the set boarding position within the internal area of the elevator,
      wherein the information of the internal area includes at least one previously input deboarding floor number,
      wherein the processor is configured to set the boarding position of the robot based on the at least one previously input deboarding floor number and a deboarding floor number of the robot.

2. The robot of claim 1, wherein the at least one detecting device includes a camera, wherein the processor is configured to:
   determine whether there is available space for the robot in the internal area, based on an image of the internal area obtained from the camera or from the elevator control device, and
   when available space is determined to be available for the robot, determine that the robot is to board the elevator.

3. The robot of claim 1, wherein the at least one detecting device includes a distance sensor, and
   wherein the processor is configured to determine whether there is available space for the robot in the internal area based on sensing data of the internal area received from the distance sensor.

4. The robot of claim 1, wherein the processor is configured to set a specific position as the boarding position within the internal area, wherein the specific position is a position equal to a reference distance from a side of the doorway of the elevator.

5. The robot of claim 1, wherein the at least one detecting device includes at least one of a camera or a distance sensor, wherein the information of the internal area includes an image of the internal area or sensing data of the internal area received from the distance sensor,
wherein the processor is configured to:
  determine whether the robot to board to a preset default boarding position in the internal area based on the information of the internal area, and
  when the robot is determined to board to the preset default boarding position, control the driving motor to move the robot to the default boarding position.

6. The robot of claim 5, wherein the processor is configured to:
when the robot is determined to not board to the preset default boarding position, detect an available space for the robot in the internal area based on the information of the internal area, and
set a specific position closest to the default boarding position as the boarding position.

7. The robot of claim 6, wherein the processor is configured to:
obtain the information of the internal area of the elevator through the communication interface or the at least one detecting device after the robot boards the elevator,
determine whether the robot is to move to the default boarding position based on the obtained information of the internal area,
control the driving motor to move the robot to the default boarding position based on the determination that the robot is to move to the default boarding position.

8. The robot of claim 1, wherein the processor is configured to:
estimate a deboarding order for at least one elevator passenger based on the at least one previously input deboarding floor number and the deboarding floor number of the robot, and
set the boarding position of the robot based on the estimated deboarding order.

9. The robot of claim 8, wherein the processor is configured to set the boarding position of the robot to be closer to a doorway of the elevator as the deboarding order is earlier.

10. The robot of claim 1, further comprising:
a memory configured to store at least one command included in a boarding position setting model obtained by a machine learning algorithm,
wherein the boarding position setting model is to output data including a boarding position labeled with input data including at least one of a boarding floor number of the robot, a deboarding floor number of the robot, at least one previously input deboarding floor number, passenger information, or a number of waiting passengers.

11. The robot of claim 1, wherein the processor is configured to determine to board the elevator when a sum of a load weight of the elevator and a weight of the robot is less than a rated weight of the elevator.

12. The robot of claim 11, wherein the processor is configured to:
obtain, by a camera of the detecting device, an image of the internal area after the robot boards the elevator,
detect, from the obtained image, a passenger and an object in the internal area,
estimate weight distribution based on the detected passenger and object, and
set the boarding position based on the estimated weight distribution.

13. A method of controlling a robot, comprising:
obtaining, from a camera or a distance sensor, information of an internal area of an elevator;
determining whether the robot to board the elevator or not to board the elevator based on the obtained information of the internal area;
setting a boarding position of the robot based on the information of the internal area when the robot is determined to board the elevator; and
controlling a driving motor to move the robot to the set boarding position within the internal area of the elevator,
wherein the information of the internal area includes at least one of an image of the internal area obtained by the camera or sensing data of the internal area obtained by the distance sensor,
wherein the information of the internal area includes at least one previously input deboarding floor number, and
wherein the setting of the boarding position includes setting the boarding position according to a deboarding order estimated based on the at least one previously input deboarding floor number and a deboarding floor number of the robot.

14. The method of claim 13, wherein the setting of the boarding position includes setting a specific position as the boarding position, wherein the specific position is a position equal to a reference distance from a side of the doorway of the elevator.

15. The method of claim 13, wherein the setting of the boarding position includes:
determining whether the robot to board to a preset default boarding position in the internal area based on the information of the internal area;
setting the preset default boarding position as the boarding position when the robot is determined to board to the preset default boarding position; and
setting a position closest to the default boarding position as the boarding position in an available space detected from the information of the internal area when the robot is determined to not board to the default boarding position.

16. The method of claim 13, wherein the setting of the boarding position includes:
inputting input data including at least one of a boarding floor number of the robot, a deboarding floor number of the robot, at least one previously input deboarding floor number, passenger information, or the number of waiting passengers, to a boarding position setting model obtained by a machine learning algorithm; and
setting a boarding position included in data output from the boarding position setting model as the boarding position.

17. The method of claim 13, further comprising:
obtaining the information of the internal area after the robot boards the elevator; and
controlling the driving motor to move the robot to a position based on the obtained information of the internal area.

18. A robot comprising:
a driving motor to provide a driving force to move the robot;
a communication interface configured to communicate with an elevator control device, the elevator control device including a computing device;
at least one detecting device configured to obtain information of an internal area of an elevator; and a processor configured to:
- determine whether the robot to board the elevator or to not to board the elevator based on data received from the elevator control device or data received from the at least one detecting device,
- when the robot is determined to board the elevator, set a boarding position within the internal area based on information of the internal area obtained from the communication interface or from the at least one detecting device, and
- control the driving motor to move the robot to the set boarding position within the internal area of the elevator,
- wherein the processor is configured to:
  - set the boarding position of the robot based on a difference between a boarding floor number of the robot and a deboarding floor number of the robot, and
  - set the boarding position of the robot to be closer to a doorway of the elevator when the difference between the boarding floor number and the deboarding floor number is smaller.

\* \* \* \* \*